United States Patent [19]

Kataoka et al.

[11] Patent Number: 4,899,083
[45] Date of Patent: Feb. 6, 1990

[54] AUTOMATIC LIGHTING SYSTEM FOR AUTOMOBILE

[75] Inventors: Sachiro Kataoka, Ebina; Yukio Yamamoto, Atsugi; Saburo Okai, Ayase, all of Japan

[73] Assignee: Nissan Motor Co., Ltd., Yokohama, Japan

[21] Appl. No.: 854,922

[22] Filed: Apr. 23, 1986

[30] Foreign Application Priority Data

Apr. 26, 1985 [JP] Japan ................................ 60-88740
Apr. 26, 1985 [JP] Japan ................................ 60-88741

[51] Int. Cl.$^4$ ............................................ B60Q 1/02
[52] U.S. Cl. ........................................ 315/77; 315/82; 307/10.8
[58] Field of Search ................ 315/76, 77, 78, 80, 315/82, 83; 307/10 LS; 340/641

[56] References Cited

U.S. PATENT DOCUMENTS

| | | | |
|---|---|---|---|
| 3,500,119 | 3/1970 | Price | 307/10 LS |
| 3,706,006 | 12/1972 | Miller | 315/83 |
| 3,774,071 | 11/1973 | Goodrich | 315/82 |
| 3,832,597 | 8/1974 | Mitchell | 315/82 |
| 3,882,452 | 5/1975 | Stevens | 315/77 |
| 4,438,384 | 3/1984 | Akita et al. | 320/48 |
| 4,667,129 | 5/1987 | Papillon | 315/82 |

FOREIGN PATENT DOCUMENTS 1962093 6/1971 Fed. Rep. of Germany .
2329050 12/1977 Fed. Rep. of Germany .

OTHER PUBLICATIONS

The Service Manual entitled "Nissan Laurel Service Manual" published by Nissan Motor Company, Nov. 1984, "Headlamp-Daytime Light System" (For Europe Model), page #L-65.

Primary Examiner—Robert L. Griffin
Assistant Examiner—T. Salindong
Attorney, Agent, or Firm—Lowe, Price, LeBlanc, Becker & Shur

[57] ABSTRACT

An automatic lighting system comprises a bypass circuit bypassing a manual lighting switch. During operation in an automatic lighting mode, headlamps and a clearance lamp of the automobile automatically turn on when the engine operation becomes stable upon completion of start-up operation. The stability in operation of the bypass circuit in the automatic lighting mode is increased by the provision of a delay circuit via which a voltage appearing at an alternator driven by the engine is applied to a base of a transistor that is used to close and open the bypass circuit. Closing a cranking motor switch to activate a cranking motor causes the bypass circuit to be inoperable so that the headlamps and clearance lamp will not turn on during engine cranking.

9 Claims, 5 Drawing Sheets

AUTOMATIC LIGHTING SYSTEM FOR AUTOMOBILE

BACKGROUND OF THE INVENTION

The present invention relates to an automatic lighting system for an automobile.

There is known an automatic lighting system which automatically closes a circuit interconnecting an electric power source and lamps, such as headlamps, to supply electric current to the lamps by bypassing a manual lighting switch. The service manual entitled "NISSAN LAUREL SERVICE MANUAL" published by Nissan Motor Company in November 1984 describes an automatic lighting system on page EL-65. Referring to FIG. 1, this known system is specifically described. There are shown in FIG. 1 a DC power source 10, i.e., a vehicle battery, a manual lighting switch 12, a left and a right headlamps 14a and 14b, and a clearance lamp 16. The manual lighting switch 12 is connected between the electric power source 10 and the lamps 14a, 14b and 16 such that input terminals X, Y, and Z thereof are connected to the power source 10 via fuses (no numerals), respectively, while output terminals X1, X2 are connected to the left headlamp 14a at its low beam terminal D and its high beam terminal H, output terminals Y1, Y2 are connected to the right headlamp 14b at its low beam terminal D and its high beam terminal H, and an output terminal Z1 is connected to the clearance lamp 16 via a noramlly closed contact of a relay 8d. The lighting switch 12 is manually operable to assume a plurality of positions including "OFF" position and "ON" position. The position of the lighting switch 12 controls the connection of the input terminal X to the output terminals X1 and X2, the connection of the input terminal Y to the output terminals Y1 and Y2, and the connection of the input terminal Z to the output terminal Z1 are controlled.

In order to supply electric current to the lamps 14a, 14b, and 16 by bypassing the manual lighting switch 12, there is provided a bypass circuit including relays 8b and 8d. The relay 8b has two pairs of normally open relay contacts, which pairs are connected between the low beam terminals of the headlamps 14a and 14b and input terminals X and Y, thereby bypassing the manual lighting switch 12. The relay 8d has a pair of normally open contacts connected between the clearance lamp 16 and the input terminal Z, thereby bypassing the manual lighting switch 12. The relays 8b and 8d have relay coils connected to be selectively responsive to current from power source 10. One end of the coil of the relay 8b is normally grounded through normally closed contacts of a relay 8c. The coil of the relay 8c is energized when the output terminal Z1 is disconnected from the input terminal Z while the manual switch 12 is in the "OFF" position. When the manual switch 12 assumes the other positions, the input and output terminals Z and Z1 are interconnected to supply electric current to the coil of the relay 8c, thus energizing same. This causes the normally closed contacts of the relay 8c to be caused.

The bypass circuit including the relays 8b and 8d is closed and permits electric current to be supplied from the power source 10 to the lamps 14a, 14b, and 16, to bypass the manual lighting switch 12 when an ignition switch 18, serving as an ignition indicator in this system, is turned on (closed), a charge indicator 24 is activated, and an oil pressure indicator 28 is activated. Thus, the lamps 14a, 14b, and 16 automatically turn on when the indicators 18, 24, and 28, which are indicative of the state of the engine, have predetermined states, respectively.

Describing these indicators, the ignition switch 18 is connected to both coils of the relays 8b and 8d via normally closed contacts of a relay 8a. The charge indicator 24 has one end connected to the power source 10 via fuse 20 and ignition switch 18 and an opposite end connected to a so-called L terminal of a voltage regulator 22 of an engine driven alternator, hereinafter called an alternator. The L terminal connects with the opposite end of the charge indicator 24. The oil pressure indicator 28 has one end connected to the power source 10 via the fuse 20 and ignition switch 18, and an opposite end connected to an oil pressure sensor switch 26.

One end of a coil of the relay 8a is connected to the power source 10 via the fuse 20 and ignition switch 18, and an opposite end connected to the L terminal via a diode D11 and to the oil pressure sensor 26 via a diode D12.

The voltage at the L terminal rises from a low level to a high level after the alternator 22 has produced an output high enough to cause energization of a stator coil, i.e., when the engine operation has been stabilized after completion of start-up operation. The charge indicator 24 turns on when the voltage at the L terminal assumes the low level, and turns off when the voltage at the L terminal rises to the high level.

The oil pressure rises to open the oil presure sensor 26 after the engine operation has become stable. Thus, the oil pressure indicator 28 turns on when the oil pressure sensor 26 is closed and turns off when the oil pressure sensor 26 is opened.

Since, as mentioned before, the opposite end of the coil of the relay 8a is connected to the L terminal and the oil pressure sensor 26, the electric current is supplied to the coil of the relay 8a when the voltage at the L terminal assumes the low level and/or the voltage appearing at the oil pressure sensor 26 assumes the low level, thus energizing the relay 8a to open its normally closed contacts. In other words, the relay 8a is energized if the engine fails to operate in a stable manner after a start-up operation initiated by closing of the ignition switch 18.

When the engine operation becomes stable, the voltage at the L terminal assumes the high level and the oil pressure sensor 26 opens. Under this condition, no current passes through the coil of the relay 8a, thus leaving the normally closed contacts thereof closed. Thus, the electric current is supplied from the power source 10 to the coils of the relays 8b and 8d via the ignition switch 18, fuse 20, and normally closed contacts of the relay 8a. This energizes of the coils of the relays 8b and 8d. Energization of the coil of the relay 8b closes its normally open contacts, while the energization of the coil of the relay 8d closes its normally open contacts, so electric current from the power source 10 flows to the low beam terminals D of the headlamps 14a and 14b and to the clearance lamp 16. As a result, the headlamps 14a, 14b and clearance lamp 16 turn on automatically when the engine operation becomes stable in response to the manual lighting switch 12 being placed in the "OFF" position.

In the above mentioned state, where the headlamps 14a, 14b, and clearance lamp 16 turn on when the manual lighting switch 12 is turned off so the system to operates in an automatic lighting mode, if the voltage at the L terminal drops to the low level or the oil pressure sensor 26 turns on, the coil of the relay 8a is energized, causing the normally closed contacts thereof to open. This cuts off the supply of electric current to the coils of the relays 8b and 8d. As a result, the headlamps 14a, 14b, and clearance lamp 16 turn off.

If, in the above-mentioned state, the ignition switch 18 is turned off, the supply of electric current to the coils of the relays 8b and 8d is cut off, causing the headlamps 14a, 14b, and clearance lamp 16 to turn off.

If, in the above-mentioned state, the lighting switch 12 is manually turned on, the input and ouput terminals Z and Z1 are connected with each other, so current flows to the coil of the relay 8c, so its normally closed contacts open. This cuts off the supply of electric current to the coil of the relay 8b, to turn off causing the headlamps 14a and 14b to turn off.

This known automatic lighting system is not satisfactory in that the lamps 14a, 14b, and 16 inadvertently turn on or off when the system is rendered operable in an automatic lighting mode.

Thus, an object of the present invention is to provide an automatic lighting system which is free from the above-mentioned problem.

A specific object of the present invention is to provide an automatic lighting system which keeps the lamps "ON" even if the signal carrying system (such as the fuse 20 or connectors) of the ignition switch fails during operation in automatic lighting mode.

A still another object of the present invention is to provide an automatic lighting system which does not cause the lamps to turn on when unnecessary.

SUMMARY OF THE INVENTION

According to the present invention, an automatic lighting system for an automotive vehicle having an engine comprises:
- an electric power source;
- means for producing light when electric current is supplied thereto;
- a manual lighting switch connected between the electric power source and the light producing means for selectively supplying electric current to the light producing means;
- an ignition switch for the engine;
- bypass circuit means connected between the electric power source and the light producing means for supplying electric current to the light producing means when it is closed;
- bypass circuit driver means connected via the ignition switch to the electric power source for closing the bypass circuit means when it is closed, said bypass circuit driver means including a switching element and being closed when the switching element remains in a conductive state;
- means responsive to a predetermined indicator derived in response to the engine entering a stable running state for rendering the switching element conductive; and
- means for preventing undesired operation of the switching element of the bypass circuit driver means thereby to stabilize operation of the bypass circuit driver means.

DESCRIPTION OF THE PREFERRED EMBODIMENTS

Figure 1:
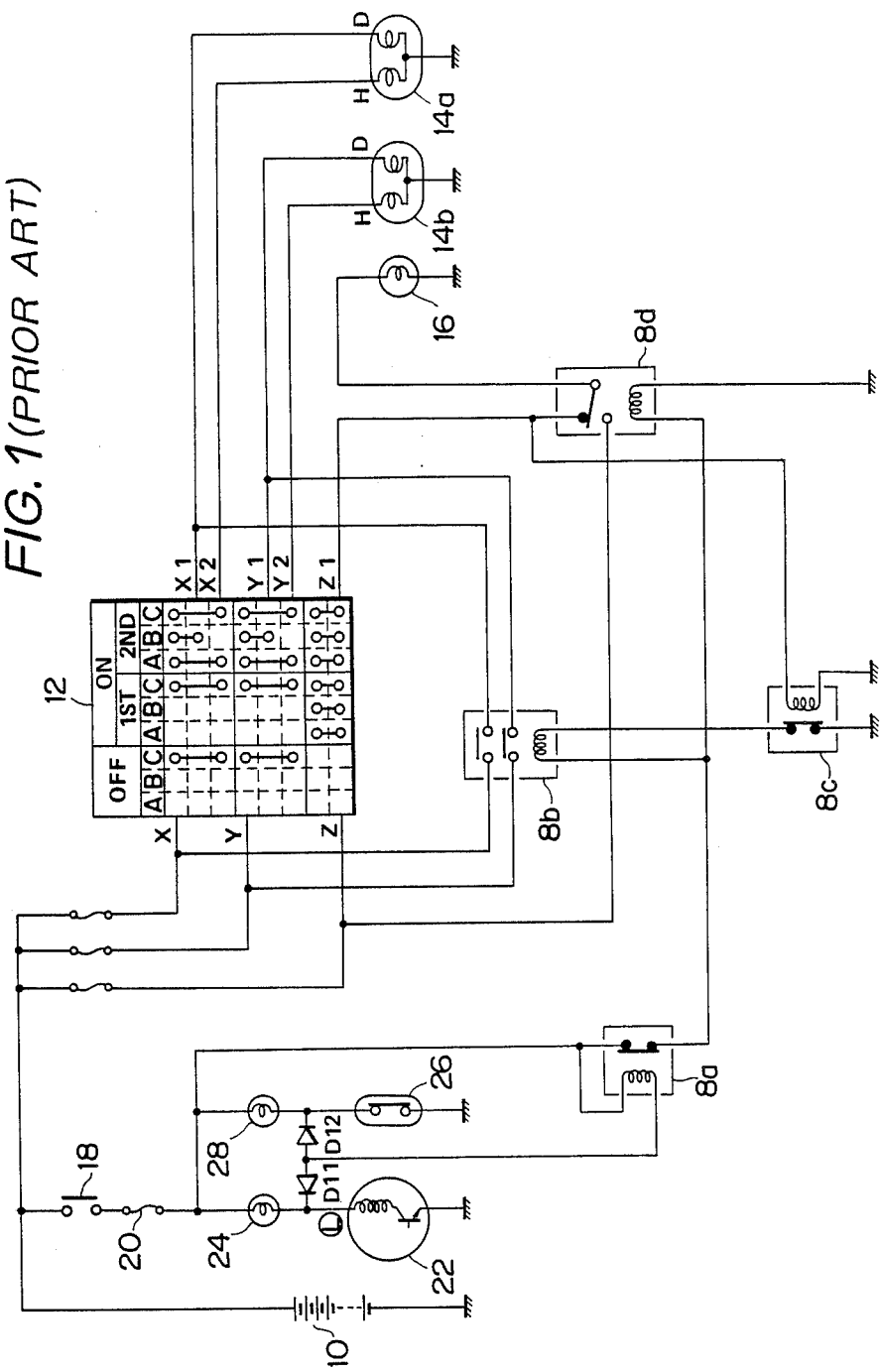
FIG. 1 is a circuit diagram of the known automatic lighting system discussed above.
Figure 2:
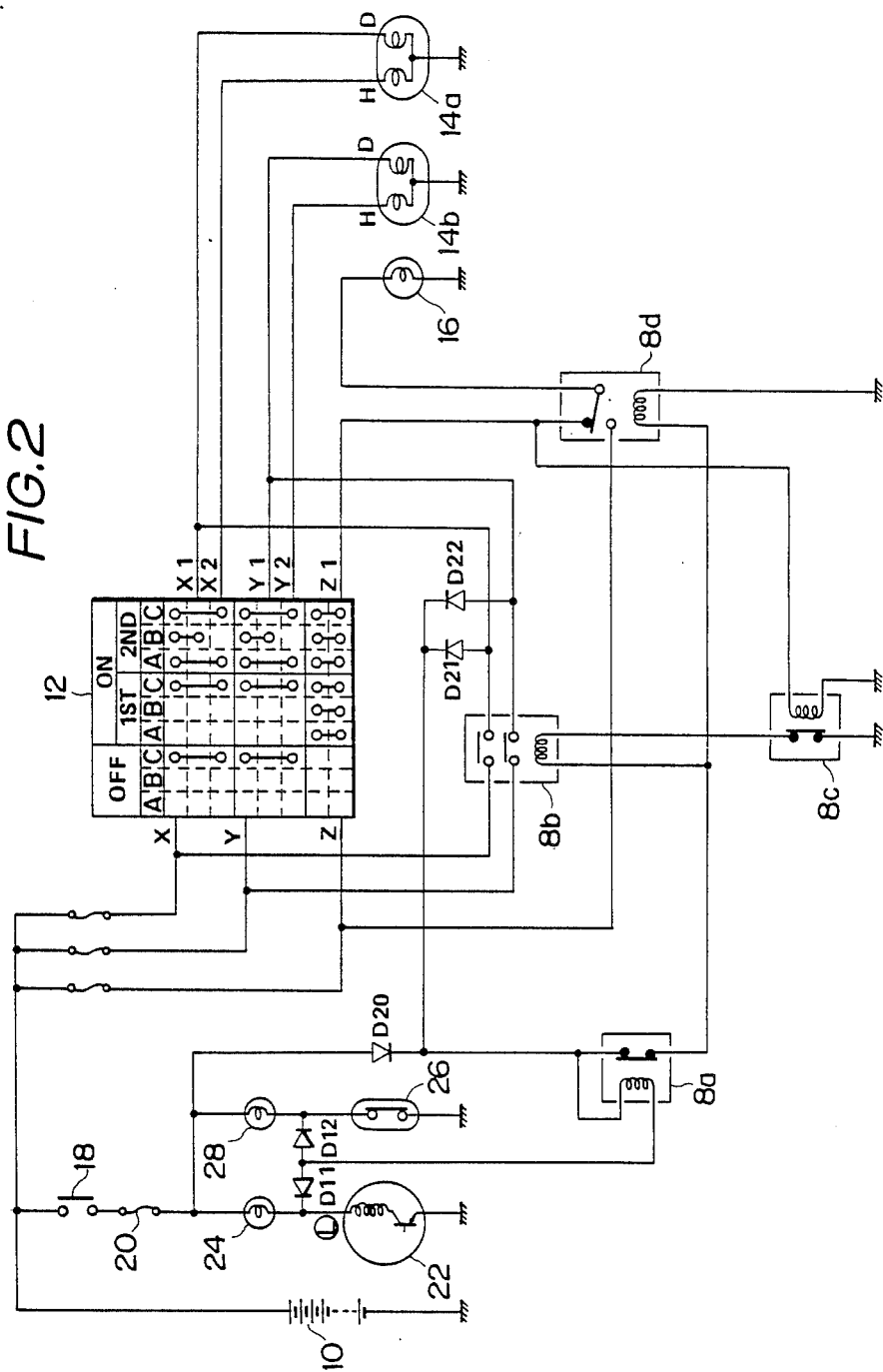
FIG. 2 is a circuit diagram of a first embodiment of an automatic lighting system according to the present invention.

Referring to FIGS. 1 and 2, like reference numerals are used to designate like parts throughout these figures for ease of understanding of the first embodiment shown in FIG. 2.

The circuit of first embodiment shown in FIG. 2 is different from the circuit of the known system shown in FIG. 1 in that diodes D20, D21, and D22 are connected to stabilize operation of the circuit.

Referring to FIG. 2, the diode D20 is connected between a fuse 20 and normally closed contacts of a relay 8a in such a manner as to prevent reverse flow of electric current. The diode D21 is connected between a conductor line interconnection an output terminal X1 of a manual lighting switch 12 and a relay 8b and the cathode of the diode D20. The diode D22 is connected between a conductor line interconnecting an output terminal Y1 of the manual lighting switch 12 and the relay 8b and the cathode of the diode D20.

This arrangement including the diodes D20, D21, and D22 functions to hold the circuit including normally open contacts of the relay 8b and normally open contacts of a relay 8d closed once the circuit has been closed closing of this circuit is initiated by closing of an ignition switch 18. Let it be assumed that the relays 8b and 8d are energized, relays 8a and 8c deenergized, and headlamps 14a, 14b, and clearance lamp 15 is turned on. If, in this state, the fuse 20 connected in series with the ignition switch 18 burns out, electric current from an electric power source 10 passes through coils of the relays 8b and 8d via an electric path along an input terminal X, one of two pairs of normally open contacts of the relay 8b, diode D21, normally closed contacts of the relay 8a, and via another electric path along an input terminal Y, the other pair of normally open contacts of the relay 8 b, diode D22, normally closed contacts of the relay 8a. Since, in this manner, the normally open contacts of the relays 8b and 8d are kept closed after burn-out of the fuse 20, the headlamps 14a, 14b, and clearance lamp 16 continue to is turned on. Thus, the operation of the circuit is stabilized.

If, in the above-mentioned state, the ignition switch 18 is turned off to cause the engine to stop, the headlamps 14a, 14b, and clearance lamp 16 turn off because the voltage appearing at an L terminal of an alternator 22 drops to a low level and an oil pressure sensor 26 turns on to cause the normally closed contacts of relay 8a to open and cut off the supply electric current to the relays 8b and 8d is. The burn-out of the fuse 20 is recognized by the driver when he or she turns on the ignition switch 18 to start the engine again. Even if the ignition switch 18 is closed, no electric current is supplied to the relays 8b and 8d so that the headlamps 14a, 14b, and clearance lamp 16 stay turned-off until the lighting switch 12 is manually turned to the "ON" position. Since no electric current is supplied to indicators 24 and 28, these indicators 24 and 28 will not turn on immediately after turning on the ignition switch 18. Thus, the driver recognizes the failure.

Figure 3:
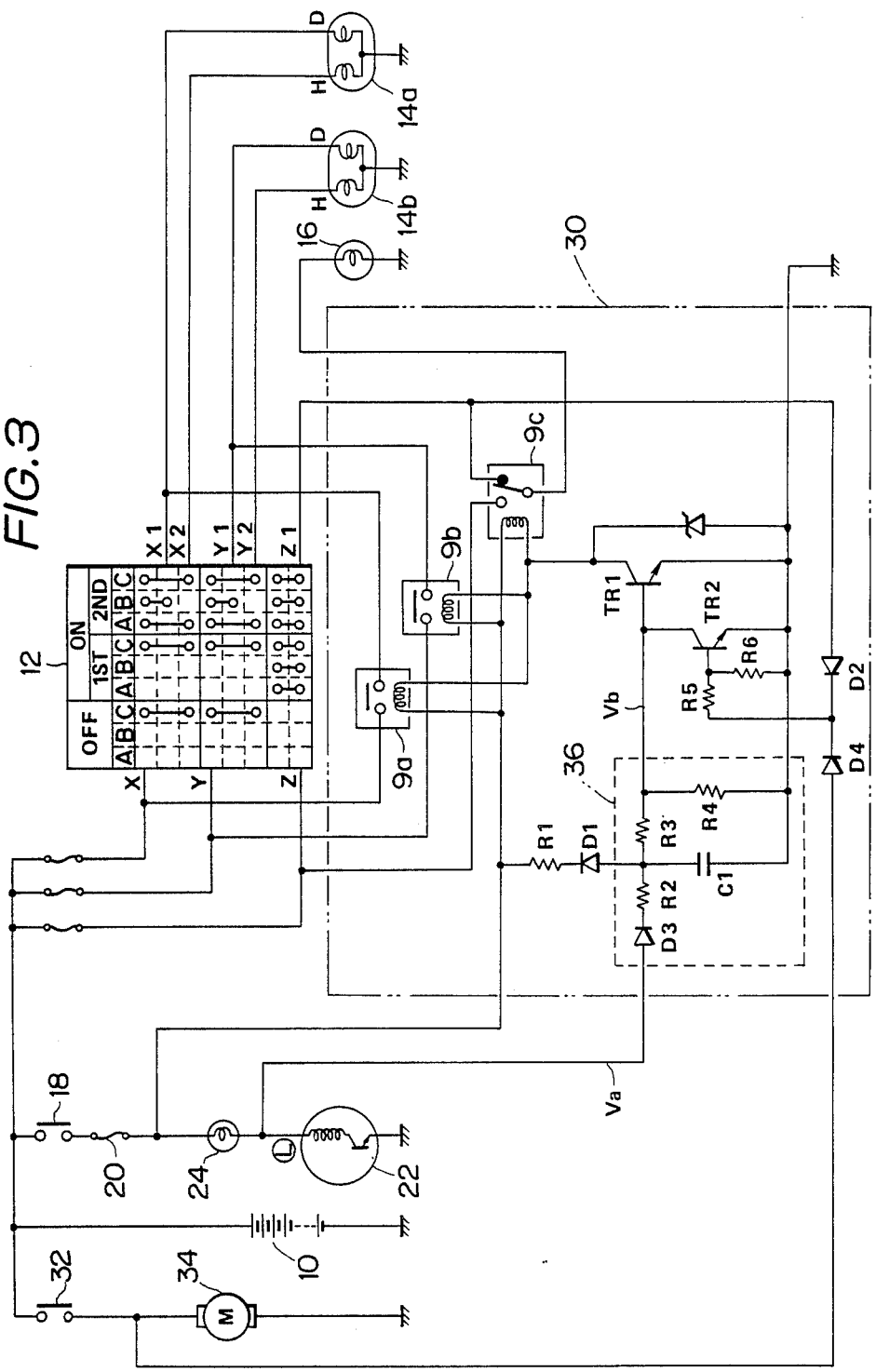
FIG. 3 is a circuit diagram of a second embodiment of an automatic lighting system according to the present invention.
Figure 4:
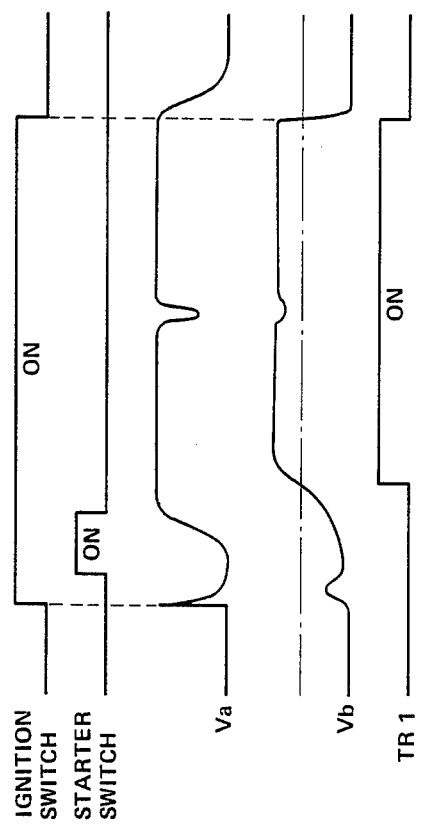
FIG. 4 is a timing diagram.

Referring to FIGS. 3 and 4, a second embodiment is hereinafter described. FIG. 3 is a the circuit diagram thereof, while FIG. 4 includes waveforms of signals appearing at various points of the circuit.

The circuit shown in FIG. 3 is similar to the circuit shown in FIG. 2 to provide interconnections between an electric power source 10, manual lighting switch 12, and headlamps 14a, 14b and clearance lamp 16, and for interconnecting ignition switch 18, fuse 20, charge indicator 24, and terminal L of alternator 22. The main difference is in the provision of a control unit 30, and a stator motor switch 32 of a stator 34.

In order to supply electric current to the lamps 14a, 14b, and 16 that bypassing the manual lighting switch 12, there is provided a circuit including three relays 9a, 9b, and 9c. More specifically, the relay 9a includes normally open contacts connected between an input terminal X and a low beam terminal D of the left headlamp 14a, while relay 9b includes normally open contacts connected between an input terminal Y and a low beam terminal D of the right headlamp 14b, and the relay 9c includes normally open contacts connected between an input terminal Z and the clearance lamp 16. Coils of these relays 9a, 9b, and 9c are connected in parallel such that one each is connected to the electric power source 10 via the fuse 20 and the ignition switch 18; the opposite ends of the coils are connected to a transistor TR1.

Assume that the ignition switch 18 is closed, so the coils of relays 9a, 9b and 9c are supplied with current whereby the normally open contacts of each of the relays 9a, 9b, and 9c are closed and to close the bypass circuit when the transistor TR1 is rendered conductive. This causes all of the lamps 14a, 14b, and 16 to turn on. When the transistor TR1 is rendered nonconductive with the ignition switch 18 closed, no electric current passes through the coils of the relays 9a, 9b, and 9c, causing the lamps 14a, 14b, and 16 to be off.

Voltage Va appearing at the terminal L of the alternator 22 is applied to an input of a delay circuit 36 which derives an output voltage Vb that is applied to a base of the transistor TR1. When this output voltage Vb is higher than a predetermined threshold value of the transistor TR1, the transistor TR1 is rendered conductive when Vb drops below this predetermined threshold value, transistor TR1 becomes nonconductive. Connected across the base-emitter circuit of the transistor TR1 is a transistor TR2. When the transistor TR2 is rendered nonconductive, the output voltage Vb of the delay circuit 36 is applied to the base of the transistor TR1, causing the same conductive or nonconductive depending on the magnitude of the voltage Vb in relation to the predetermined threshold value. If the transistor TR2 becomes conductive, the voltage at the base of the transistor TR1 remains lower than the predetermined threshold value, thus making the transistor TR1 nonconductive. This causes the bypass circuit including the relays 9a, 9b, and 9c to be inoperable. A base bias circuit for transistor TR2 contains resistors R5 and R6. Connected to the base of the transistor TR2 via the resistor R5 and a diode D2 is the output terminal Z1 of the manual lighting switch 12. The base of the transistor TR2 is also connected to the stator motor switch 32 via the resistor R5 and a diode D4.

During engine cranking in response to stator switch 32 being closed to energize the stator motor 34, a voltage at a connection point where the stator motor switch 32 is connected to the stator motor 34 rises to a value high enough to render the transistor TR2 conductive, thereby opening the bypass circuit including the relays 9a, 9b, and 9c, to render the bypass circuit inoperable. Thus, the bypass circuit is open circuited when the stator motor switch 32 is closed during cranking operation.

When the manual lighting switch 12 is in the "ON" position, the output terminal Z1 is connected to the input terminal Z whereby the a voltage at the output terminal Z1 rises high enough to render the transistor TR2 conductive.

As will now be understood from the above description, the output voltage Vb of the delay circuit 36 controls the conductive/nonconductive states of the transistor TR2 only when the stator motor switch 32 is open and the manual lighting switch 12 is placed in the "OFF" position with the ignition switch 18 being closed. Thus, this is where the bypass circuit is operable in the automatic lighting mode.

The delay circuit 36 is a low pass filter that includes a capacitor C1, resistors R2, R3, and R4, and a diode R3. When the voltage Va at the terminal L of the alternator 22 rises, the capacitor C1 is charged. The rate at which the output voltage Vb rises is therefore delayed by an amount determined by the time constant of the circuit including capacitor C1 as shown in FIG. 4. When the input voltage Va drops, electric current is discharged by the capacitor C1 toward the resistor R3. The rate at which the output voltage Vb drops is therefore delayed as shown in FIG. 4. A sharp change, in a pulse like manner, in voltage Va which takes place upon turning on the ignition switch 18 or which may take place for some reasons is almost absorbed and thus does not appear in the output voltage Vb (see FIG. 4). When the voltage Vb is higher than the predetermined threshold value, as indicated by dotted chain line in FIG. 4, the transistor TR1 is conductive; when the voltage Vb drops below this value, the transistor TR becomes nonconductive.

The start-up operation of the engine is hereinafter described by referring to FIG. 4. The voltage Va at the terminal L of the alternator 22 rises sharply and then drops exponentially immediately after the ignition switch 18 is closed. Thus, the voltage Va does not drop rapidly due to the inductance component of the alternator 22. This pulse-like sharp increase in the voltage Va is absorbed by the delay circuit 36 and thus does not cause the transistor TR1 to become conductive. Thus, the headlamps 4a, 4b, and clearance lamp 16 are not turned on by this pulse-like, sharp change in the voltage Va taking place immediately after the ignition switch 18 has been turned on.

Subsequently, the stator motor switch 32 is closed to activate the stator motor 34 to crank the engine. During the cranking operation, the transistor TR2 is rendered conductive to prevent the transistor TR1 from becoming conductive. Because the transistor TR1 remains nonconductive, the lamps 14a, 14b, and 16 will not turn on during the cranking operation, so that the start-up performance is not adversely affected.

When the stator motor switch 32 is turned off after the cranking operation, the transistor TR2 becomes nonconductive, whereby the forced nonconductive state of the transistor TR1 is released. This allows the voltage Vb to control the conductive/nonconductive state of the transistor TR1. Thus, when the voltage Va at the L terminal of the alternator 22 rises to the high level and the voltage Vb rises above the predetermined threshold value, the transistor TR1 is rendered conductive. The conductive state of the transistor TR1 causes electric current to pass through the coils of the relays 9a, 9b, and 9c, closing the bypass circuit bypass the manual lighting switch 12, and allow electric current to flow to the headlamps 14a, 14b, and clearance lamp 16, causing them to turn on.

If, during running of the engine, the engine speed drops to such a low level as to cause the engine to stall for a short period of time and then the engine speed increases, the voltage Va drops and then increases in a very short period of time, to provide a negative pulse.

The negative pulse in the voltage waveform Va is absorbed, i.e., filtered, by the delay circuit 36 so that the transistor TR1 stays conductive. Thus, the headlamps 14a, 14b, and clearance lamp 16 stay on. Therefore, the operational stability of the circuit bypassing the manual lighting switch 12 is increased.

When the ignition switch 18 is turned off and the engine stops, the capacitor C1 of the delay circuit 36 is rapidly discharged via a diode D1 and a resistor R1, thus reducing the voltage Vb immediately. Therefore, even if the ignition switch 18 is turned on immediately after the engine has stopped, the headlamps 14a, 14b, and clearance lamp 16 will not turn on.

When the manual lighting switch 12 is turned to the "ON" position, the forced nonconductive state of the transistor TR1 is established, whereby the headlamps 14a, 14b, and the clearance lamp 16 do not turn on or off automatically.

Figure 5:
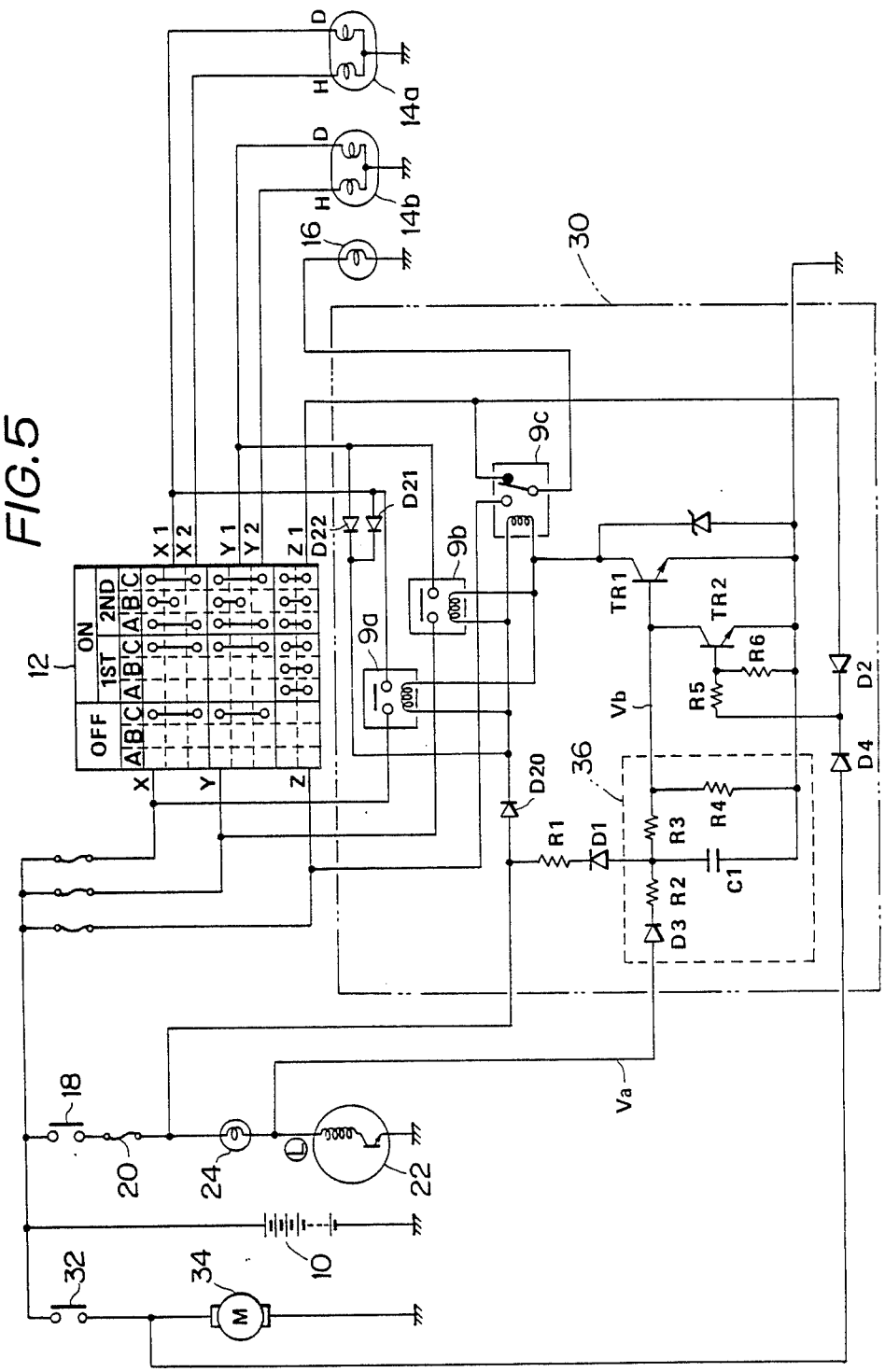
FIG. 5 is a circuit diagram of a third embodiment of an automatic lighting system according to the present invention.

A third embodiment of the invention, illustrated in FIG. 5, is substantially the same as the second embodiment except for the provision of diodes D20, D21, and D22.

The diodes D20, D21, and D22 are so disposed as to perform the same function as counterparts of the first embodiment. Diode D20 is connected in a conductor line between fuse 20 and coils of relays 9a, 9b, and 9c; the anode of diode D20 is connected to a terminal of resistor R1. the diodes D21 and D22 are connected between the cathode side of the diode D20 and low beam terminals D of headlamps 14a and 14b, respectively.

The detailed description of the operation is omitted because the diodes D20, D21, and D22 work in the same manner as in the first embodiment shown in FIG. 2. IF the fuse 20 burns out while relays 9a, 9b, and 9c are energized to cause the headlamps 14a, 14b, and clearance lamp 16 to turn on, current flow to the relays 9a, 9b, and 9c via the diode D20 is cut off, but electric current is supplied to the relays 9a, 9b, and 9c via the diodes D21 and D22. Thus, the lamps 14a, 14b, and 16 remain on.

As will now be appreciated from the foregoing description of the preferred embodiments, the present invention provides an improved automatic lighting system which is free from inadverdent turn-off of the lamps during an automatic lighting mode.

From the description of the second embodiment made in connection with FIGS. 3 and 4, it will be appreciated that the start-up performance of the engine is maintained at a high level by preventing harmful lamps turn-on during the cranking operation.

What is claimed is:

1. An automatic lighting system for an automotive vehicle having an engine, comprising:
    an electric power source;
    means for producing light when electric current is supplied thereto;
    a manual lighting switch connected between said electric power source and said light producing means for selectively supplying electric current to said light producing means;
    an ignition switch for the engine;
    bypass circuit means connected between said electric power source and said light producing means for supplying electric current to said light producing means when said bypass circuit means is closed;
    bypass circuit driver means connected via said ignition switch to said electric power source for maintaining said bypass circuit means closed when said bypass circuit means is closed, said bypass circuit driver means including a switching element, said bypass circuit driver means being energized when said switching element remains in a conductive state;
    means responsive to a predetermined indication derived in response to the engine entering a stable running state for rendering said switching element conductive; and
    means for preventing undesired operation of said switching element of said bypass circuit driver means thereby to stabilize operation of said bypass circuit driver means.

2. The automatic lighting system of claim 1 wherein said undesired operation preventing means includes means for holding said switching element of said bypass circuit driver means conductive once said switching element has been rendered conductive.

3. The automatic lighting system of claim 1 wherein said undesired operation preventing means includes a delay circuit having an output connected to said switching element and an input responsive ot said predetermined indicator.

4. The automatic lighting system of claim 3 wherein said undesired operation preventing means includes means for holding said switching element of said bypass circuit driver means conductive once said switching element has been rendered conductive.

5. An automatic lighting system for an automobile including an engine, an electric power source, an ignition switch, a fuse, an alternator having one terminal connected via the fuse and the ignition switch to the electric power source and an opposite grounded terminal, a stator motor switch, and a stator motor for cranking the engine connected via the stator motor switch to the electric power source, the system comprising:
    electrically responsive lights;
    a manual lighting switch connected between the electric power source and said lights for selectively supplying current from the electric power source to said lights;
    bypass circuit means connected between the electric power source and said lights to bypass said manual lighting switch and supply current from the electric power source to said lights when the bypass circuit means is closed;
    bypass circuit driver means having one end connected via the fuse and the ignition switch to the source of electric power source and an opposite end grounded, said bypass circuit driver means being energized in response to a stable engine operating condition indicating voltage signal being derived at the one terminal of the alternator, said bypass circuit driver means closing siad bypass circuit means;

means cooperating with said manual lighting switch for opening said bypass circuit driver means when said manual lighting switch is closed thereby to open said bypass circuit means when said manual lighting switch is closed; and means for supplying current from the electric power source to said bypass circuit driver means to bypass the fuse and the ignition switch and hold said bypass circuit driver means closed once said bypass circuit driver means has been closed.

6. The automatic lighting system of claim 5 wherein said bypass circuit driver means includes a first switching element and a delay circuit having an input connected to the one terminal of the alternator and an output connected to said first switching element.

7. The automatic lighting system of claim 6 wherein said bypass circuit driver means includes a second switching element connected between said output of said delay circuit and the ground.

8. An automatic lighting system for an automobile including an engine, an electric power source, an ignition switch, a fuse, an alternator having one terminal connected via the fuse and the ignition switch to the electric power source and an opposite grounded terminal, a stator motor switch, and a stator motor for cranking the engine connected via the stator motor switch to the electric power source, the system comprising:

electrically responsive lights;

a manual lighting switch connected between the electric power source and said lights for selectively supplying current from the electric power source to said lights;

bypass circuit means connected between the electric power source and said lights to bypass said manual lighting switch and supply current from the electric power source to said lights when the bypass circuit means is closed;

bypass circuit driver means having one end connected via the fuse and the ignition switch to the source of electric power source and an opposite end grounded, said bypass circuit driver means including a first switching element and a delay circuit having an input connected to the one terminal of the alternator and an output connected to said first switching element and a second switching element connected between said output of said delay circuit and the ground, said second switch element being connected via the stator motor switch to the electric power source so that said second switching element becomes conductive when the stator motor switch is closed to ground said output of said delay circuit, said bypass circuit driver means being closed in response to a voltage signal derived at the one terminal of the alternator for closing said bypass circuit means;

means cooperating with said manual lighting switch for opening said bypass circuit driver means when said manual lighting switch is closed thereby to open said bypass circuit means when said manual lighting switch is closed; and means for supplying current from the electric power source to said bypass circuit driver means to bypass the fuse and the ignition switch and hold said bypass circuit driver means closed once said bypass circuit driver means has been closed.

9. The automatic lighting system of claim 8 wherein said means for opening said bypass circuit driver means includes said second switching element.

* * * * *